No. 775,942. PATENTED NOV. 29, 1904.
J. SITTER.
PEA OR BEAN THRESHER.
APPLICATION FILED DEC. 8, 1903.
NO MODEL.
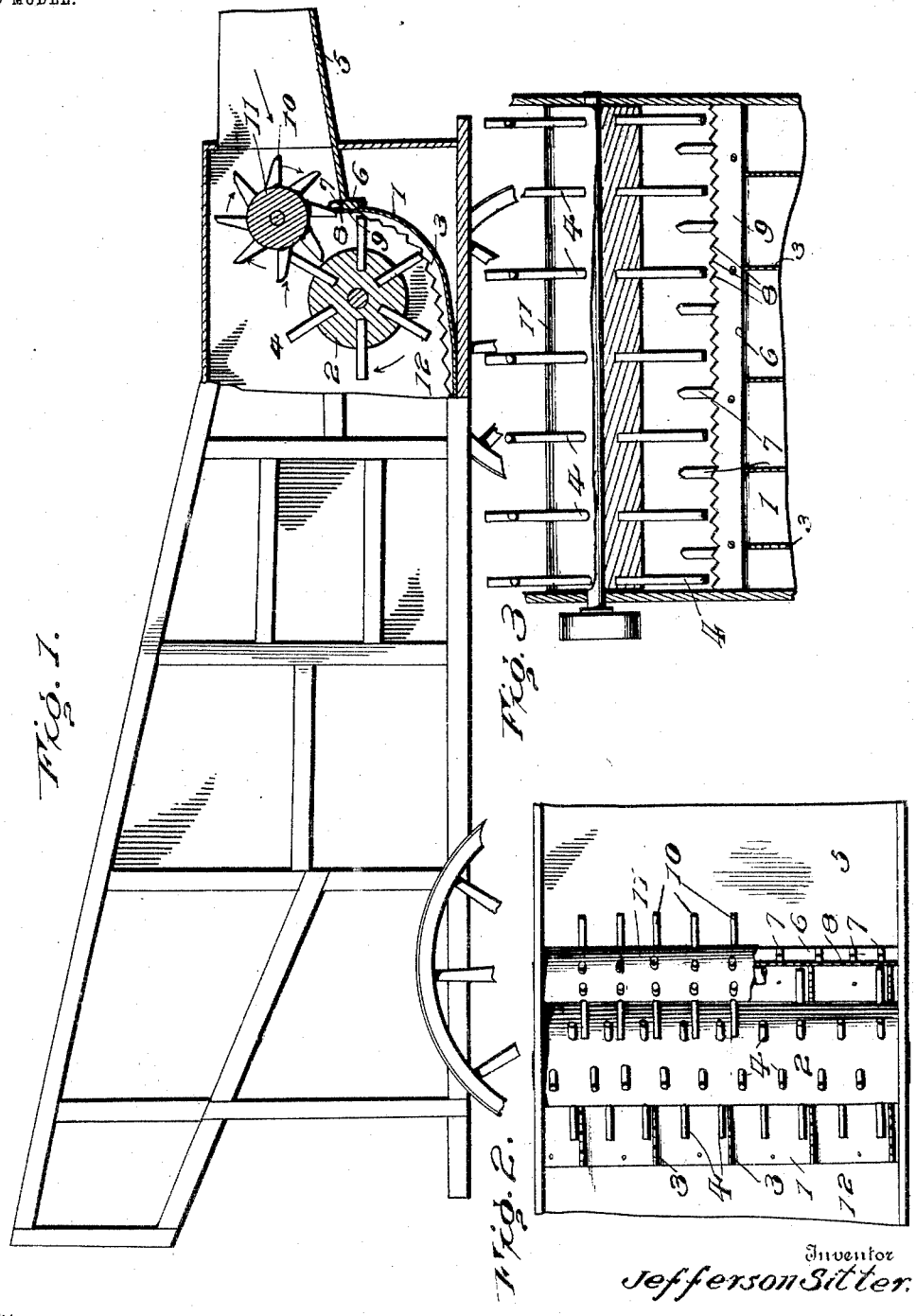
Inventor
Jefferson Sitter.
Witnesses
By
R. S. & A. B. Lacey, Attorneys No. 775,942.

Patented November 29, 1904.

UNITED STATES PATENT OFFICE.

JEFFERSON SITTER, OF WESTERN SARATOGA, ILLINOIS.

PEA OR BEAN THRESHER.

SPECIFICATION forming part of Letters Patent No. 775,942, dated November 29, 1904.

Application filed December 8, 1903. Serial No. 184,311. (No model.)

*To all whom it may concern:*

Be it known that I, JEFFERSON SITTER, a citizen of the United States, residing at Western Saratoga, in the county of Union and State of Illinois, have invented certain new and useful Improvements in Pea or Bean Threshers, of which the following is a specification.

This invention relates to the type of agricultural machinery for liberating peas, beans, and the like from their hulls or pods, its special purpose being to facilitate the work and to minimize the loss from crushing or marring the berries commonly experienced in machines for this work as heretofore generally constructed.

The invention deals most especially with the threshing mechanism and the means for feeding the vines thereto, all as will appear more fully hereinafter and illustrated in the drawings hereto attached, in which—

Figure 1 is an elevation of a thresher and separator embodying the invention, the threshing and feeding mechanisms being in section. Fig. 2 is a top plan view of the threshing-cylinder and rotary beater. Fig. 3 is a front view of the retarder located at the juncture of the chute and concave and coöperating with the threshing mechanism and rotary beater.

Corresponding and like parts are referred to in the following description and indicated in all the views of the drawings by the same reference characters.

The threshing mechanism illustrated is of the undershot type and comprises the concave 1 and threshing-cylinder 2, each being provided with coöperating teeth arranged in parallel rows and having the teeth of one row staggered with reference to the teeth of the adjacent rows. The teeth are of similar construction and are comparatively thin and wide and are arranged with the width in line with the direction of travel of the material through the machine, so as to withstand the strain.

The vines or material to be threshed is fed to the machine along the chute 5, which is inclined toward its delivery end to facilitate the feeding operation. A retarder is located at the delivery end of the chute and at the entrance to the threshing mechanism and comprises the transverse bar 6, teeth 7, and spurs or saw-teeth 8 along the upper edge of a plate 9, attached to the bar 6. The teeth 7 are let into the bar 6 and are slightly inclined at their upper ends toward the threshing-cylinder and are spaced apart a distance to admit of the passage therebetween of the teeth 10 of the rotary beater 11. The upper rear corners of the teeth 7 are beveled, which in connection with the inclination of the teeth, permit the vines to ride thereover in the operation of the machine, so as to obviate choking. The plate 9 having the saw-teeth 8 along its upper edge is provided as an economical manner of supplying the saw-teeth 8, which engage with the vines and in conjunction with the teeth 7 hold the same while the teeth 4 of the threshing-cylinder tear through the hulls and liberate the peas, beans, or the like.

The rotary beater is located above the retarder and at the delivery end of the chute 5 and comprises a cylinder 11 and teeth 10, the latter being arranged in parallel rows around the cylinder and tapered toward their outer ends. The teeth 10 operate between the teeth 7 and the teeth 4 and carry the vines forward against the action of the teeth 4, which engage therewith and move the vines over the concave 1 and into the separator.

The material to be threshed, as vines bearing peas, beans, or the like, is supplied to the chute 5 and moved forward to the inner end, when it is taken up by the teeth of the rotary beater and carried forward into the threshing mechanism, the retarder preventing the too rapid feed and holding the vines while the pods or hulls are broken by the teeth 3 and 4, so as to liberate the berries.

The broken pods, the vines, and the peas are delivered from the threshing mechanism into the separator 12, which may be of any construction to effect separation of the matter in the well-known manner.

Having thus described the invention, what is claimed as new is—

In combination, a threshing mechanism comprising a toothed concave and a toothed cylinder, a chute arranged in a higher plane than the concave and connected therewith, a toothed plate at the juncture of the concave and chute, a series of teeth arranged subjacent to the toothed plate and at the delivery end of the chute, and a rotary beater arranged above the delivery end of the chute and operating across the entrance to the threshing mechanism and having its teeth arranged to coöperate with the teeth of the threshing-cylinder and with the two sets of teeth at the inner or delivery end of the chute, substantially as set forth.

In testimony whereof I affix my signature in presence of two witnesses.

JEFFERSON SITTER. [L. S.]

Witnesses:
J. S. McCarty,
W. C. Tripp.